June 10, 1930.          E. L. BOWLES          1,762,543
                         BINDING POST
                      Filed Aug. 16, 1926

Inventor
Edward L. Bowles
by David Rines
Attorney

Patented June 10, 1930

1,762,543

UNITED STATES PATENT OFFICE

EDWARD L. BOWLES, OF WATERTOWN, MASSACHUSETTS

BINDING POST

Application filed August 16, 1926. Serial No. 129,497.

The present invention, though having more general fields of usefulness, is more particularly related to binding posts. The chief object of the invention is to prevent binding posts from becoming loosened upon their panel supports. Other and further objects will be explained hereinafter, and will be particularly pointed out in the appended claims.

Figure 1:
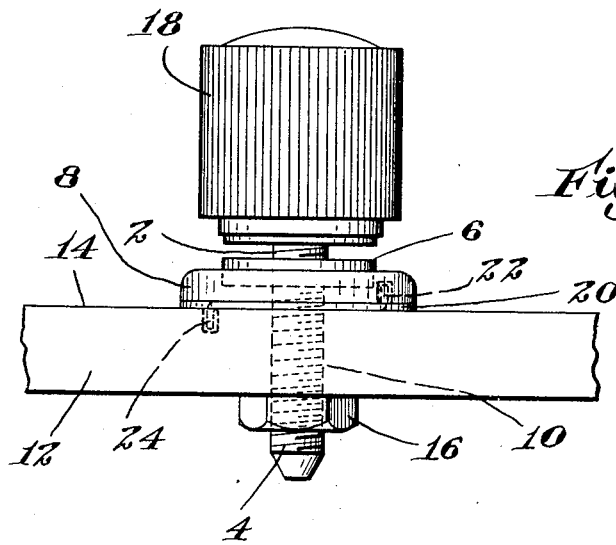
Figure 2:
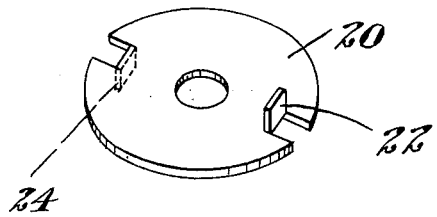

Fig. 1 of the accompanying drawing is an elevation of a preferred embodiment of the present invention; and Fig. 2 is a perspective of a detail.

The binding post is illustrated as comprising a stem threaded at its ends 2 and 4 and integral with a clamping element 6 about which an insulating body portion 8 is molded. The portion 4 extends through an opening 10 in a panel 12 so that the body 8 rests on the upper face 14 of the panel. The post is secured to the panel by a nut 16 threaded upon the threaded end 4 of the stem. A clamping cap 18 is threaded upon the portion 2 of the stem. Manipulation of the cap has a tendency to loosen the binding post, and as the nut 16 is often inaccessible the binding post becomes wobbly on the panel and practically useless.

According to the present invention, a washer 20 is disposed about the stem 4, between the panel 12 and the body 8. The washer 20 is preferably of sheet metal and is provided with two or more tongues 22 and 24 that are struck out of the sheet metal on opposite sides thereof, as illustrated. The tongue or tongues 22 on one side are embedded in a previously drilled opening or openings in the body 8, and the tongue or tongues 24 on the other side in a previously drilled opening or openings in the panel 12. Loosening of the post upon the panel is thus easily and economically prevented when the nut 16 has once firmly secured the parts together.

As the tongue-receiving openings in the panel and the body 8 are invisible, they do not mar the appearance and, in fact, the binding post may be mounted in place without the use of the washer in those cases where loosening of the binding post is unlikely.

The invention is not, of course, restricted to the exact embodiment of the invention that is illustrated and described herein, as modifications may be made by persons skilled in the art without departing from its spirit and scope, as defined in the appended claims.

What is claimed is:

1. In a binding-post assembly comprising a panel having an opening and a clamping element resting upon the panel and having a stem extending into the opening for assembly purposes and having also a post upon which a clamping cap is rotatably mounted to cooperate with the clamping element, a washer disposed between the clamping element and the panel and having tongues located within the outer periphery of the washer, one of the tongues entering the element and another tongue entering the panel to lock the clamping element against rotation relative to the panel.

2. In a binding-post assembly comprising a panel having an opening and a clamping element resting upon the panel and having a threaded stem on one side thereof extending into the opening, the clamping element being secured to the panel by a threaded element on the threaded stem, and the clamping element having on the other side thereof a threaded post upon which a clamping cap is threaded to cooperate with the clamping element, a sheet-metal washer separate from the clamping element and the panel and disposed about the threaded stem between the clamping element and the panel and having tongues struck out therefrom on opposite sides thereof within the outer periphery of the washer, the clamping element and the panel having openings disposed within the outer periphery of the clamping element for receiving the tongues to lock the clamping element against rotation relative to the panel.

In testimony whereof, I have hereunto subscribed my name.

EDWARD L. BOWLES.